US010901407B2

(12) United States Patent
Iskandar et al.

(10) Patent No.: US 10,901,407 B2
(45) Date of Patent: Jan. 26, 2021

(54) SEMICONDUCTOR DEVICE SEARCH AND CLASSIFICATION

(71) Applicant: Applied Materials, Inc., Santa Clara, CA (US)

(72) Inventors: Jimmy Iskandar, Fremont, CA (US); Michael D. Armacost, San Jose, CA (US); Heng Hao, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 458 days.

(21) Appl. No.: 15/610,280

(22) Filed: May 31, 2017

(65) Prior Publication Data

US 2017/0343999 A1 Nov. 30, 2017

Related U.S. Application Data

(60) Provisional application No. 62/343,605, filed on May 31, 2016.

(51) Int. Cl.
G05B 23/02 (2006.01)
G06F 16/248 (2019.01)
(52) U.S. Cl.
CPC ....... *G05B 23/0291* (2013.01); *G06F 16/248* (2019.01)
(58) Field of Classification Search
None
See application file for complete search history.

(56) References Cited

U.S. PATENT DOCUMENTS

| 2005/0165731 A1* | 7/2005 | Funk ...................... G05B 15/02 |
| 2005/0187649 A1* | 8/2005 | Funk .................. G05B 19/4184 |
| | | 700/121 |
| 2008/0155450 A1* | 6/2008 | Pannese ................ G05B 15/02 |
| | | 715/772 |

(Continued)

OTHER PUBLICATIONS

N. D. Pham, Q. L. Le and T. K. Dang, "Two Novel Adaptive Symbolic Representations for Similarity Search in Time Series Databases," 2010 12th International Asia-Pacific Web Conference, Busan, 2010, pp. 181-187. IEEE Xplore, < https://ieeexplore.ieee.org/document/5474139 >. [Accessed: Sep. 11, 2019]. (Year: 2010).*

*Primary Examiner* — Aleksandr Kerzhner
*Assistant Examiner* — Eddy Cheung
(74) *Attorney, Agent, or Firm* — Patterson + Sheridan, LLP

(57) ABSTRACT

Embodiments provide techniques for compressing sensor data collected within a manufacturing environment. One embodiment monitors a plurality of runs of a recipe for fabricating one or more semiconductor devices within a manufacturing environment to collect runtime data from a plurality of sensors within the manufacturing environment. The collected runtime data is compressed by generating, for each of the plurality of sensors and for each of the plurality of runs, a respective representation of the corresponding runtime data that describes a shape of the corresponding runtime data and a magnitude of the corresponding runtime data. A query specifying one or more runtime data attributes is received and executed against the compressed runtime data to generate query results, by comparing the one or more runtime data attributes to at least one of the generated representations of runtime data.

20 Claims, 7 Drawing Sheets

(56) References Cited

U.S. PATENT DOCUMENTS

2011/0288660 A1* 11/2011 Wojsznis ......... G05B 19/41875
 700/30
2014/0372813 A1* 12/2014 Shin ..................... G06F 11/076
 714/704
2016/0371599 A1* 12/2016 Nicholas ................. G06F 11/26
2017/0116524 A1* 4/2017 Hariharan .............. G06N 20/00

* cited by examiner

SEMICONDUCTOR DEVICE SEARCH AND CLASSIFICATION

TECHNICAL FIELD

Embodiments of the present disclosure generally relate to fault detection for manufacturing environments, and more particularly, to techniques for facilitating the efficient search and classification of raw sensor data.

BACKGROUND

Manufacturing facilities across many different industries are responsible for producing products that are used in every facet of life. In the case of semiconductor manufacturing, for example, semiconductor manufacturing facilities manufacture products such as microprocessors, memory chips, microcontrollers, and other semiconductor devices that have a ubiquitous presence in everyday life. These semiconductor devices are used in a wide variety of applications, examples of which include automobiles, computers, home appliances, cellular phones, and many others. Further, in recent years, both the number of applications and demand for devices (including semiconductor devices) has steadily increased. This increased demand has led manufacturing facilities to become increasingly conscious of increasing product variety and reducing delivery times.

Each manufacturing environment is unique and extremely complex, often requiring immense amounts of capital for the necessary equipment, tools, facilities, etc. In semiconductor manufacturing environments, for example, the semiconductor manufacturing production process is generally divided into two parts, "front-end" and "back-end," both of which use different types of semiconductor manufacturing equipment. Front-end typically refers to wafer fabrication. For example, front-end manufacturing facilities generally start with blank semiconductor wafers (e.g., silicon wafers) and perform various processes, such as photolithography, deposition, etching, cleaning, ion implantation, chemical and mechanical polishing, etc., to fabricate a completed wafer with many semiconductor die on the wafer. Back-end typically refers to the assembly and testing of individual semiconductor devices. For example, once the front-end production process is completed, the completed wafers are transferred to a back-end manufacturing facility, which typically performs functions such as dicing the completed wafer into individual semiconductor die, testing, assembly, packaging, etc.

In today's world of just-in-time manufacturing and shipping, it is becoming increasingly important for manufacturing facilities to be able to accurately predict when they will be able to ship a product so that proper commitments can be made to customers. For this reason, many manufacturing facilities typically perform production planning to attempt to predict if and when they will be able to meet customer demand, plan future equipment need based on demand, and the like.

Further, even in manufacturing facilities that build and implement custom-built planning systems, these custom built planning systems are difficult to maintain and inflexible, which makes it difficult to make modifications to the planning system. In many cases, for example, the manufacturing facility may undergo changes, such as modifications to existing equipment, incorporating new equipment, equipment failures, changes to the facility due to regulatory requirements, etc. Adapting custom-built planning systems to account for such changes can require a level of technical expertise that may not be available to the manufacturing facility (e.g., an end user may not have coding experience, etc.), require a significant time commitment, substantial costs (e.g., due to the complexity of the facilities), etc.

Problems can periodically arise in manufacturing environments that result in faulty runs of the product being manufactured. For example, equipment failures can result in a product being manufactured outside of a designated range of tolerances, rendering the manufactured product inoperable or unsuitable for its intended purposes. However, it can be challenging to detect these problems before a substantial number of runs have completed, resulting in a substantial amount of wasted product and thus a substantial amount of cost.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
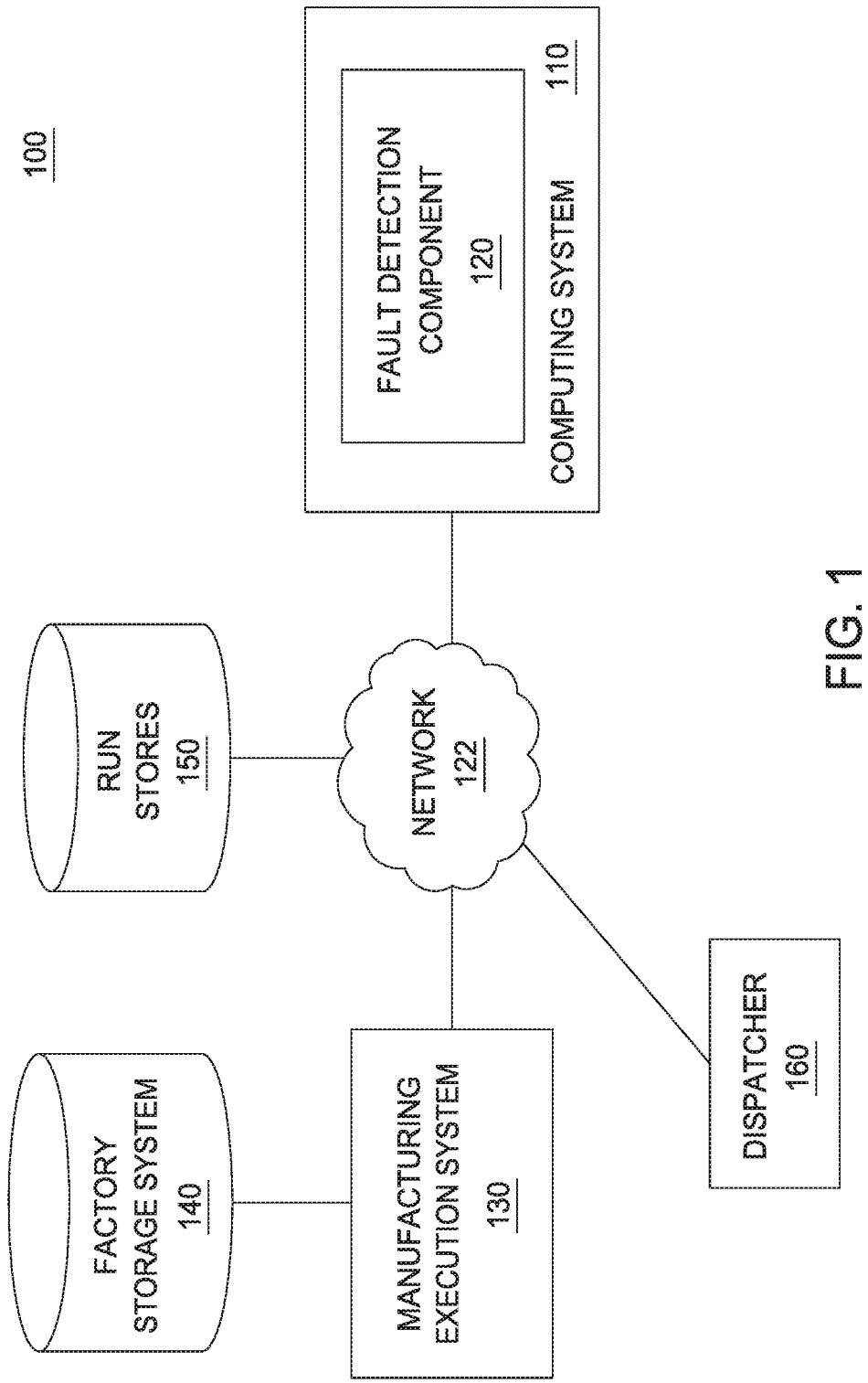
FIG. 1 illustrates a block diagram of an architecture of a manufacturing environment configured with a fault detection component, according to one embodiment described herein.

One embodiment presented in this disclosure provides a method that includes monitoring a plurality of runs of a recipe for fabricating one or more semiconductor devices within a manufacturing environment to collect runtime data from a plurality of sensors within the manufacturing environment. The method includes compressing the collected runtime data by generating, for each of the plurality of sensors and for each of the plurality of runs, a respective representation of the corresponding runtime data that describes a shape of the corresponding runtime data and a magnitude of the corresponding runtime data. The method also includes receiving a query specifying one or more runtime data attributes. Additionally, the method includes executing the query against the compressed runtime data to generate query results, by comparing the one or more runtime data attributes to at least one of the generated representations of runtime data, and returning the query results.

Another embodiment provides a method that includes monitoring a plurality of runs of a recipe for fabricating one or more semiconductor devices within a manufacturing environment to collect runtime data from a plurality of sensors within the manufacturing environment. The method includes compressing the collected runtime data by generating, for each of the plurality of sensors and for each of the plurality of runs, a respective representation of the corresponding runtime data that describes a shape of the corresponding runtime data and a magnitude of the corresponding runtime data. The method also includes dividing the plurality of runs into a plurality of groups, by analyzing the compressed runtime data, where the runs assigned to each of the plurality of groups are determined to have similar compressed runtime data attributes to each other. Additionally, the method includes generating a data model describing attributes of the plurality of groups. Upon receiving subsequent runtime data collected during a subsequent run of the recipe within the manufacturing environment, the method includes classifying the subsequent run of the recipe into a first group of the plurality of groups, using the generated data model.

Another embodiment provides a method that includes monitoring a plurality of runs of a plurality of recipes for fabricating one or more semiconductor devices within a manufacturing environment. The method includes collecting runtime data from a plurality of sensors within the manufacturing environment. The method also includes compressing the collected runtime data by generating, for each of the plurality of sensors and for each of the plurality of runs, a respective representation of the corresponding runtime data that describes a shape of the corresponding runtime data. Additionally, the method includes receiving a query specifying one or more runtime data attributes. The method further includes executing the query against the compressed runtime data to generate query results, by comparing the one or more runtime data attributes to at least one of the generated representations of runtime data, wherein the comparisons between the one or more runtime data attributes and the at least representation of runtime data are performed based on the shape of the corresponding runtime data using dynamic time warping techniques and returning the query results.

Example Embodiments

Production planning and management for manufacturing facilities (or factories) is a very complex and time-consuming process. For example, production flows within manufacturing facilities are often uncertain, loading within the manufacturing facilities can change frequently (e.g., due to equipment failures, processing speeds of different tools, etc.), different products can require different amounts of resources, and so on. Additionally, problems can occur within the manufacturing environment, resulting in faulty, unsuitable or otherwise less desirable manufactured products. For example, worn parts within the manufacturing equipment, gas leaks, and the like can all negatively impact the products being manufactured. However, it can be difficult to detect these problems before a substantial amount of defective products have been manufactured, resulting in a substantial amount of wasted time and resources.

Additionally, once an engineer determines that a problem has occurred within the manufacturing environment (e.g., resulting in defective products being manufactured), it is frequently a difficult and time-consuming process to determine the source of the problem. Because modern manufacturing environments are highly complex systems that include numerous interworking parts, the number of different problems that can occur is substantial and determining which of the vast number of different potential problems is actually occurring is a challenging task that is currently performed manually by a technician within the manufacturing environment.

One challenge when modelling complex manufacturing environments is processing the vast amount of data available within a reasonable period of time. For example, a given manufacturing environment may include hundreds of sensors, each collecting sensor data over multiple steps of multiple runs of a recipe. Examples of such sensors include, without limitation, temperature sensors, gas detection sensors, laser and fiber optic sensors, camera sensors, and so on. Generally, any form of sensor suitable for collecting data within a manufacturing environment can be used, consistent with the present disclosure.

Such raw sensor data can grow substantially large over time, making searching and processing the raw sensor data difficult, if not infeasible, due to the substantial amount of computing resources and time needed to process the data. For instance, while an engineer may wish to use the collected raw sensor data in classifying a particular run of a recipe (e.g., as a faulty run, a normal run, etc.), such an operation may take such a substantial amount of time and computing resources to complete that it is inefficient or even infeasible. For example, analyzing the sensor data collected during one run of a recipe using a sophisticated data modelling analysis that takes into account years of raw sensor data may take hours, if not days, to complete, making such an analysis impractical for real-world usage with existing computing technology.

One way to address these limitations is to generate approximations of the collected sensor data and to process the approximated sensor data, rather than the raw sensor data. However, inherent in such techniques is some loss in accuracy, due to working with approximations rather than the raw sensor data itself. Moreover, the accuracy of data models generated using the approximation can vary substantially, depending on how accurately the raw sensor data was approximated.

In this disclosure, techniques are described for compressing sensor data collected within a manufacturing environment. In one embodiment, a software component monitors a plurality of runs of a recipe for fabricating one or more semiconductor devices within a manufacturing environment and collects runtime data from a plurality of sensors within the manufacturing environment. The software component then compresses the collected runtime data by generating, for each of the plurality of sensors and for each of the plurality of runs, a respective representation of the corresponding runtime data that describes a shape of the corresponding runtime data and a magnitude of the corresponding runtime data. For instance, the software component could generate a string value, in which each of a plurality of temporal portions of a unit of sensor data (e.g., the data collected from a particular sensor during a particular step of a particular recipe) is represented with a single character from a predefined alphabet of characters (e.g., the letters A through G).

In one embodiment, the runtime sensor data is separated by the step of the recipe during which the data was collected. That is, each recipe can include multiple distinct steps that are executed in order to manufacture the product, and embodiments can record which step of the recipe a given unit of data was collected during. Embodiments could collect sensor data from the plurality of sensors during each step of the recipe, and could generate a respective shape for each sensor and for each step of the recipe. By taking into account which step of the recipe the current production run is executing, embodiments can more accurately classify the current run of the recipe.

The software component could then receive a query specifying one or more runtime data attributes and could execute the query against the compressed runtime data to generate query results, by comparing the one or more runtime data attributes to at least one of the generated representations of runtime data. Upon executing the query, the software component could return the query results.

Another embodiment provides techniques for classifying a run of a recipe using compressed sensor data. In such an embodiment, a software component could monitor a plurality of runs of a recipe for fabricating one or more semiconductor devices within a manufacturing environment to collect runtime data from a plurality of sensors within the manufacturing environment. The software component could then compress the collected runtime data by generating, for each of the plurality of sensors and for each of the plurality of runs, a respective representation of the corresponding runtime data that describes a shape of the corresponding runtime data and a magnitude of the corresponding runtime data. That is, the software component could generate a representation of the shape of the sensor data, for each sensor, during each step of each run of the recipe.

The software component could also divide the plurality of runs into a plurality of groups, by analyzing the compressed runtime data, where the runs assigned to each of the plurality of groups are determined to have similar compressed runtime data attributes to each other. The software component could further generate a data model describing attributes of the plurality of group. For instance, the software component could generate the data model describing an average shape of the compressed runtime data for runs classified into each respective group. For example, the software component could determine a number of clusters of runs having similarly shaped sensor values, and could determine an average shape of the sensor values for each cluster. In one embodiment, the software component is configured to represent the shape using a vector of discrete symbols.

Such a data model could further describe, for each of the plurality of groups, patterns of sensor data for the respective group. That is, the data model could describe sensor values (e.g., a threshold value for a particular sensor or type of sensor) and/or patterns of sensor values (e.g., a rate of change for a particular sensor or type of sensor) for each group that, when satisfied, indicate that a current run should be classified into the corresponding group. As an example, the data model could specify that a particular temperature sensor within the manufacturing environment reaching or exceeding a predefined level is indicative of a particular classification of run (e.g., a faulty run).

Additionally, the data model could describe a relative importance of each of a plurality of sensor types of the plurality of sensors in indicating the respective group. For example, the data model could indicate that while the temperature sensor data reaching or exceeding the predefined level is indicative of a particular classification, a gas sensor detecting a gas leak of a particular type of gas is greatly indicative of the particular classification.

Embodiments can then use the generated data model to classify subsequent runs of the recipe within the manufacturing environment into one of the plurality of groups. For example, upon receiving subsequent runtime data collected during a subsequent run of the recipe within the manufacturing environment, the software component could classify the subsequent run of the recipe, using the generated data model. That is, the software component could classify the subsequent run of the recipe into one of multiple groups (e.g., good run, faulty run, etc.) through the use of compressed sensor data. For example, the software component could generate a vector of discrete symbols representing the shape of the sensor data for the subsequent run of the recipe, and could determine a group described within the data model which best matches the vector of discrete symbols. More specifically, the software component could generate a representation of the shape of the sensor data, for each sensor, during each step of the subsequent run of the recipe, and the software component could compare each generated representation with corresponding representations within the data model to determine the group that most closely matches the subsequent run of the recipe.

Note that, for the sake of convenience, many of the following embodiments are described with reference to semiconductor manufacturing facilities (e.g., front-end and back-end facilities) as reference examples of types of manufacturing environments that may undergo planning using the techniques presented herein. Note, however, that the techniques presented herein can also be applied to other types of manufacturing environments (e.g., in other industries).

FIG. 1 is a block diagram illustrating an architecture of a manufacturing environment (or system) 100, in which aspects of the present disclosure may be practiced. For example, in one embodiment, the manufacturing environment 100 is an example of a semiconductor front-end or back-end manufacturing facility. As shown, the manufacturing environment 100 includes a computing system 110, manufacturing execution system (MES) 130, factory storage system 140, dispatcher 160 and run stores 150 connected via a network 122. In general, the network 122 can be a wide area network (WAN), local area network (LAN), wireless LAN (WLAN), etc. The factory storage system 140 and run stores 150, in general, can be any kind of storage system, including, for example, relational and/or hierarchal databases, distributed filing systems, etc. In one embodiment, the computing system 110 and MES 130 can be any kind of physical computing system having a network interface, such as a desktop computer, laptop computer, mobile device, tablet computer, server computing systems, gateway computers, and the like.

The MES 130 is generally configured to manage and control the operation of a current work-in-progress (WIP) within the manufacturing environment 100. For a front-end semiconductor manufacturing factory, the MES 130 can control one or more processes related to the fabrication of semiconductor wafers. For a back-end semiconductor manufacturing factory, the MES 130 can control one or more processes related to cutting, assembly, and testing of semiconductor die on the wafers. The MES 130 can monitor the operation of one or more tools (or equipment) operating in the manufacturing environment 100, receive data directly from the tools and/or a monitoring system, analyze the received data, and/or collect the data. In one embodiment, the MES 130 can store the data (received from the tools) into factory storage system 140. Such information stored in the factory storage system 140 can include information regarding the current WIP, number of tools in the manufacturing environment, operating parameters (e.g., processing speeds, capacity load, and the like) of the tools, manufacturing data, and other metadata characteristic of the manufacturing environment 100.

A management system (not shown) can be configured to collect, store, manage and interpret data related to resources within the manufacturing environment (e.g., amount of capital, raw materials, production capacity, etc.), current and future commitments within the manufacturing environment (e.g., orders, projected sales, delivery dates, etc.), information related to supply chain management (e.g., such as information that describes movement and storage of raw materials, WIP inventory, amount of finished goods, finances, and other information related to the flow of goods and services from supplier to ultimately the consumer), and the like. In one embodiment, some or all of this information can be stored into the factory storage system 140.

As shown, the computing system 110 includes a fault detection component 120. In one embodiment, the fault detection component 120 is configured to generate a data model by analyzing compressed historical recipe run data (e.g., stored within factory storage system 140) and to use such a data model for detecting anomalous runs of the recipe (e.g., good, faulty, etc.). For instance, the fault detection component 120 could monitor a plurality of runs of a recipe within a manufacturing environment to collect runtime data from a plurality of sensors, e.g., temperature sensors, gas detection sensors, laser and fiber optic sensors, camera sensors, and so on. The fault detection component 120 could then compress the raw sensor data by generating a representation describing the shape of the raw sensor data and a magnitude of the raw sensor data.

The fault detection component 120 could then analyze the compressed data to generate a data model. Such a data model could describe, for each of the plurality of groups, patterns of sensor data indicative of the respective group. That is, the data model could describe sensor values (e.g., a threshold value for a particular sensor or type of sensor) and/or patterns of sensor values (e.g., a rate of change for a particular sensor or type of sensor) for each group that, when satisfied, indicate that a current run should be classified into the corresponding group. For example, the data model could specify patterns of sensor data for each sensor and for each step of the recipe, that are indicative of a normal (i.e., a non-faulty run) of the recipe. Continuing the example, the data model could specify conditions for multiple sensors within the manufacturing environment that, when satisfied by sensor readings from a current run, are indicative of a particular anomalous classification for the current run (e.g., a faulty run). Additionally, the data model could describe a relative importance of each of a plurality of sensor types of the plurality of sensors in indicating the respective group. For example, the data model could indicate that while the temperature sensor data reaching or exceeding the predefined level is indicative of a particular classification, a gas sensor detecting a gas leak of a particular type of gas is greatly indicative of the particular classification.

The fault detection component 120 can then use the generated data model to classify subsequent runs of the recipe within the manufacturing environment (e.g., as a normal run or as an anomalous run). For instance, the fault detection component 120 can access additional runtime data collected during a subsequent run of the recipe (e.g., by querying factory storage system 140) and can compare the additional runtime data against the data model to classify the subsequent run. For example, the fault detection component 120 can determine whether the subsequent run's sensor data best matches the historical sensor data collected during normal runs of the recipe or patterns of data detected during anomalous runs of the recipe. In doing so, the fault detection component 120 can take into account the various weights for each type of sensor specified within the data model. Doing so enables embodiments to weight the data collected from the various sensors appropriately, and thereby improves the accuracy of the classification.

In one embodiment, the fault detection component 120 is configured to consider the step of the recipe during which the additional runtime data was collected when comparing the additional runtime data with values in the data model. That is, each recipe can include multiple distinct steps that are executed in order to manufacture the product, and the fault detection component 120 (or a monitoring system within the manufacturing environment 100) can record which step of the recipe a given unit of data was collected during. The fault detection component 120 could then collect sensor data from the plurality of sensors during each step of the recipe, and could compare the collected sensor data with data within the model for the corresponding step of the recipe in order to classify the current run. For example, the data model could specify a rate of temperature increase for a particular sensor during a particular step of the recipe is indicative of a particular classification, and could specify a much lesser rate of temperature increase for the same sensor during a later step of the recipe is indicative of the same classification. As such, the fault detection component 120 could classify a current run into a different group, depending on the step during which a particular sensor reading was taken. In other words, a particular rate of temperature increase detected by a particular sensor could be indicative of a good run during a certain step of the recipe, while the same rate of temperature increase detected by the same sensor could be indicative of a faulty run during another step of the same recipe. By taking into account which step of the recipe the current production run is executing, embodiments can more accurately classify the current run of the recipe.

In one embodiment, the fault detection component 120 is configured to use the compressed sensor data to facilitate the efficient search and analysis of the collected sensor data. For example, the fault detection component 120 could receive a query specifying one or more runtime data attributes and could execute the query against the compressed runtime data to generate query results. For instance, the fault detection component 120 could comparing the one or more runtime data attributes to at least one of the generated representations of runtime data to determine which generated representations match the specified one or more runtime data attributes of the query. The fault detection component 120 could then return the matching representations (or indications thereof) as query results.

In a particular embodiment, the fault detection component 120 is configured to compress the runtime sensor data by generating a shape of the runtime data that is represented using a time series representation (e.g., an indexable Symbolic Aggregate Approximation (iSAX) representation). For example, the fault detection component 120 could generate a vector of discrete symbols (e.g., letters A-Z, numbers 1-30, etc.) that represents the shape of the runtime data with respect to time. More generally, any technique suitable for representing a shape of the sensor data can be used, consistent with the functionality described herein.

According to one embodiment, the fault detection component 120 can perform the comparisons between the one or more runtime data attributes and the representations of runtime data using dynamic time warping. For instance, the fault detection component 120 can perform the comparisons based on the shape of the corresponding runtime data and without respect to time. As an example, a first axis (e.g., the x axis) of the shape of the corresponding runtime data could correspond to time and a second axis (e.g., the y axis) of the shape of the corresponding runtime data could correspond to the sensor data values collected from the corresponding sensor. When executing the query against the compressed sensor data, the fault detection component 120 could scale the shape of the corresponding runtime data with respect to the first axis, and could compare the scaled shape with the one or more runtime data attributes specified within the query.

For instance, the fault detection component 120 could determine that two runs are similar to one another when the shapes of sensor data collected by a particular sensor are sufficiently similar to one another, even when the time values at which the sensor values were collected do not align. As an example, a step of a first recipe could be performed over 60 seconds, while the corresponding step of a different recipe could be performed over 90 seconds. Continuing the example, the fault detection component 120 could scale the sensor data collected during a run of the first recipe to a 90 second window of time (e.g., by adjusting the time stamps at which the sensor data values were collected by a scaling value), and could then compare the scaled shape of the sensor data with the shape of sensor data collected during a run(s) of the second recipe. Doing so enables the fault detection component 120 to detect similarities between different runs of different recipes.

Additionally, the fault detection component 120 can be configured to generate a data model from the compressed sensor data for use in detecting anomalous runs of a recipe. For instance, the fault detection component 120 could monitor a plurality of runs of a recipe for fabricating one or more semiconductor devices within a manufacturing environment to collect runtime data from a plurality of sensors within the manufacturing environment, and the fault detection component 120 could compress the collected runtime data by generating, for each of the plurality of sensors and for each of the plurality of runs, a respective representation of the corresponding runtime data that describes a shape of the corresponding runtime data and a magnitude of the corresponding runtime data. The fault detection component 120 could then dividing the plurality of runs into a plurality of groups, by analyzing the compressed runtime data, where the runs assigned to each of the plurality of groups are determined to have similar compressed runtime data attributes to each other.

For instance, in one embodiment, the fault detection component 120 is configured to assign the runs to either a normal (i.e., non-faulty) group or a faulty group. As another example, the fault detection component 120 could be configured to assign the runs to a normal group or one of multiple distinct types of faulty groups. The fault detection component 120 can then generate a data model describing attributes of the plurality of group.

Upon receiving subsequent runtime data collected during a subsequent run of the recipe within the manufacturing environment, the fault detection component 120 could classifying the subsequent run of the recipe into a first one of the plurality of groups, using the generated data model. For example, the fault detection component 120 could determine that the subsequent runtime data best matches the sensor data attributes of the normal group and could classify the subsequent run accordingly. As another example, the fault detection component 120 could determine that the subsequent runtime data is sufficiently different from the attributes of the normal group, and could classify the subsequent run as an anomalous run. As yet another example, the fault detection component 120 could determine which of a plurality of distinct types of faulty runs the subsequent runtime data best matches, and could classify the subsequent run accordingly.

In one embodiment, upon classifying the subsequent run as a faulty run, the fault detection component 120 could determine one or more maintenance operations that have historically influenced the classification of runs of the recipe within the manufacturing environment from the faulty group into normal group. For example, for a particular type of faulty run, the fault detection component 120 could access predefined data describing maintenance operations that have historically been performed to correct the fault(s) causing runs to be classified as the particular type of faulty run. The fault detection component 120 could then initiate the performance of the one or more maintenance operations within the manufacturing environment, without requiring user interaction. For example, the one or more maintenance operations could include (i) an auto-calibration operation for one or more pieces of equipment within the manufacturing environment and (ii) initiating a run of a maintenance recipe, distinct from the recipe, within the manufacturing environment. Doing so enables the fault detection component 120 to perform automated maintenance operations to correct problems within the manufacturing environment, without requiring user intervention, improving the performance of the manufacturing environment itself.

Figure 2:
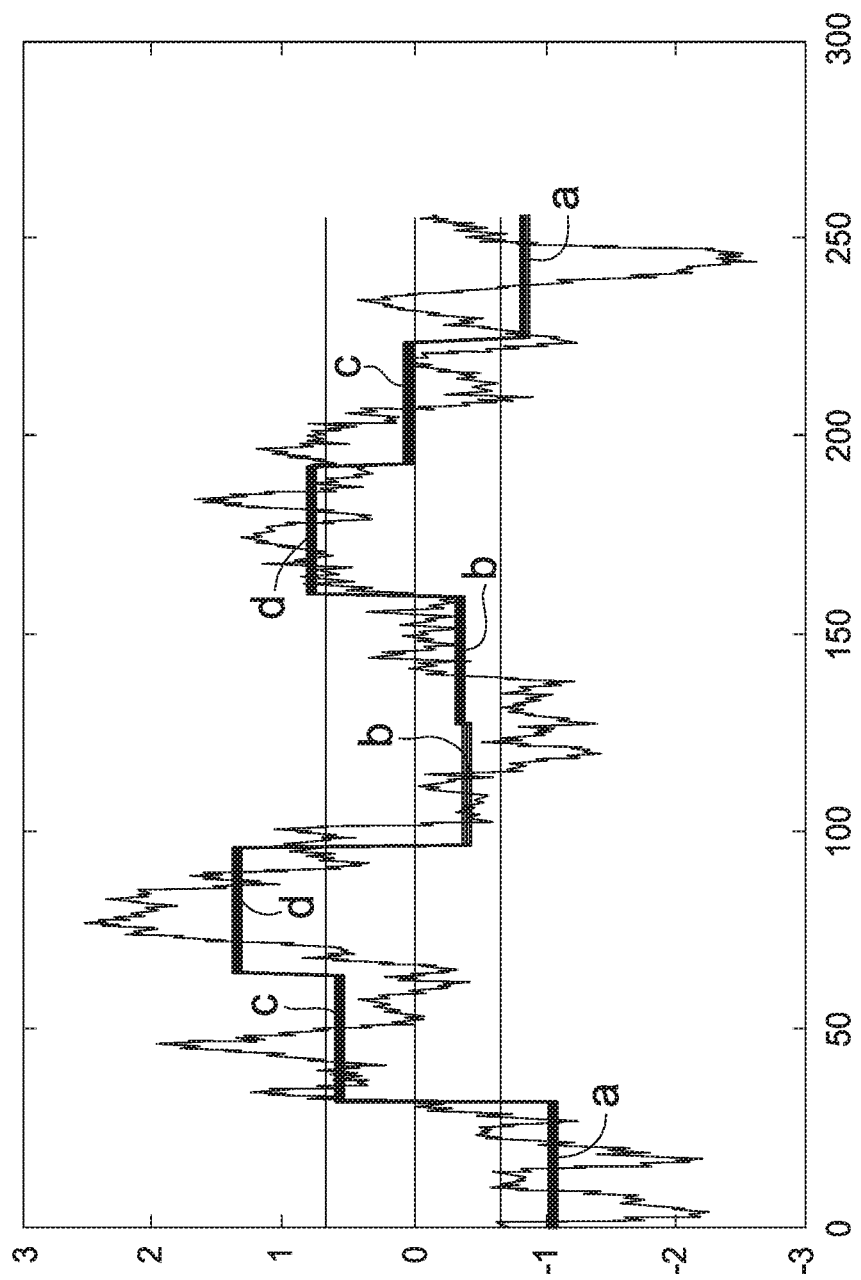
FIG. 2 is an illustration depicting a representation of a shape of sensor data plotted with respect to time, according to one embodiment described herein.

As described above, the fault detection component 120 can be configured to compress raw sensor data collected within the manufacturing environment by generating a representation of a shape of the raw sensor data with respect to time. An example of this is shown in FIG. 2, which is an illustration depicting a representation of a shape of sensor data (also referred to herein as traces) plotted with respect to time, according to one embodiment described herein. As shown, the illustration 200 depicts the sensor values collected by a sensor device within a manufacturing environment along the y axis, plotted with respect to time (x axis). Although the values for a particular sensor device ranging from approximately −3.0 to 3.0 are shown in the illustration 200, more generally values from any type of sensor device having any magnitude can be used, consistent with the functionality described herein.

Additionally, the illustration 200 shows a vector of discrete symbols that has been generated to represent the shape of the sensor values. More specifically, in the illustration 200, the string "ACDBBDCA" has been generated to represent the sensor data, with each discrete symbol representing a different magnitude of the sensor value. Generally, the fault detection component 120 can be configured to adjust the rate of compression of the sensor data. For instance, the fault detection component 120 can increase the size of the alphabet of discrete symbols used to represent the shape of the sensor data, thereby allowing the fault detection component 120 to more accurately represent the shape (e.g., symbols A-Z, as opposed to symbols A-D). Additionally, the fault detection component 120 can increase the length of the vector used to represent the shape of the sensor data (e.g., a vector containing 64 characters, as opposed to 8). As the rate of compression of the data generally scales with the rate of loss of the data, the fault detection component 120 can be configured to use a particular representation of the shape of the sensor data that best matches the particular use-case and the computing resources available (e.g., a high rate of compression enabling fast searching, a lower rate of compression enabling more accurate classification, etc.).

Figure 3:
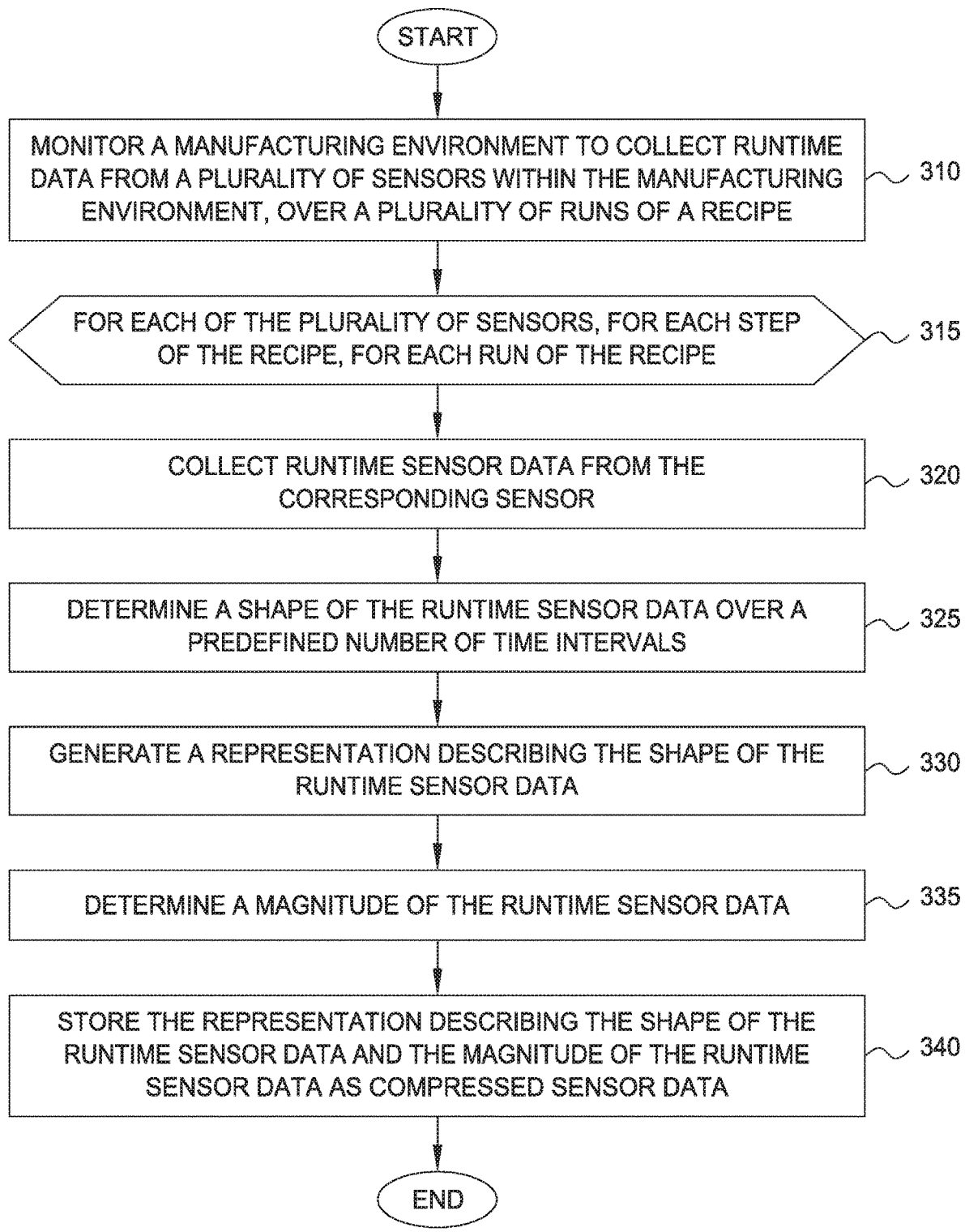
FIG. 3 is a flow diagram illustrating a method of compressing sensor data collected within a manufacturing environment, according to one embodiment described herein.

FIG. 3 is a flow diagram illustrating a method of compressing sensor data collected within a manufacturing environment, according to one embodiment described herein. As shown, the method 300 begins at block 310, where the fault detection component 120 monitors a plurality of sensors within a manufacturing environment to collect runtime sensor data, over a plurality of runs of a recipe. The fault detection component 120 then, for each of the plurality of sensor, for each step of the recipe, and for each run of the recipe (block 315), collects runtime sensor data from the corresponding sensor (block 320). The fault detection component 120 then determines a shape of the corresponding runtime sensor data (block 325) and generates a representation describing the shape of the runtime sensor data (block 330).

For example, the fault detection component 120 could plot the runtime sensor data with respect to time values (e.g., using times at which the runtime sensor data was collected), and could map a predefined number of discrete symbols from a predefined alphabet of symbols onto the shape of the plotted runtime sensor data. For example, the fault detection component 120 could divide the shape of the plotted runtime sensor data into 8 equal portions, and the fault detection component 120 could map 8 symbols selected from the alphabet of A, B, C, D, E, F and G onto each portion of the plotted runtime sensor data, where each symbol in the alphabet corresponds to a respective magnitude of the sensor data (e.g., the symbol A could represent the lowest value with respect to the axis on which the sensor data is plotted, and the symbol G could represent the highest value with respect to the axis on which the sensor data is plotted). Of course, more generally, any number of portions (i.e., any length of vector) and any number of discrete symbols can be used, consistent with the functionality described herein.

Additionally, in the depicted example, the fault detection component 120 determines a magnitude scaling value of the runtime sensor data (block 335). That is, the fault detection component 120 could determine a magnitude scaling value that can be applied to the representation of the shape (e.g., a vector of discrete values) to substantially recreate the raw sensor data (i.e., to decompress the compressed sensor data, with potentially some measure of loss). The fault detection component 120 stores the representation of the shape of the runtime sensor data along with the determined magnitude value (block 340), and the method 300 ends.

Figure 4:
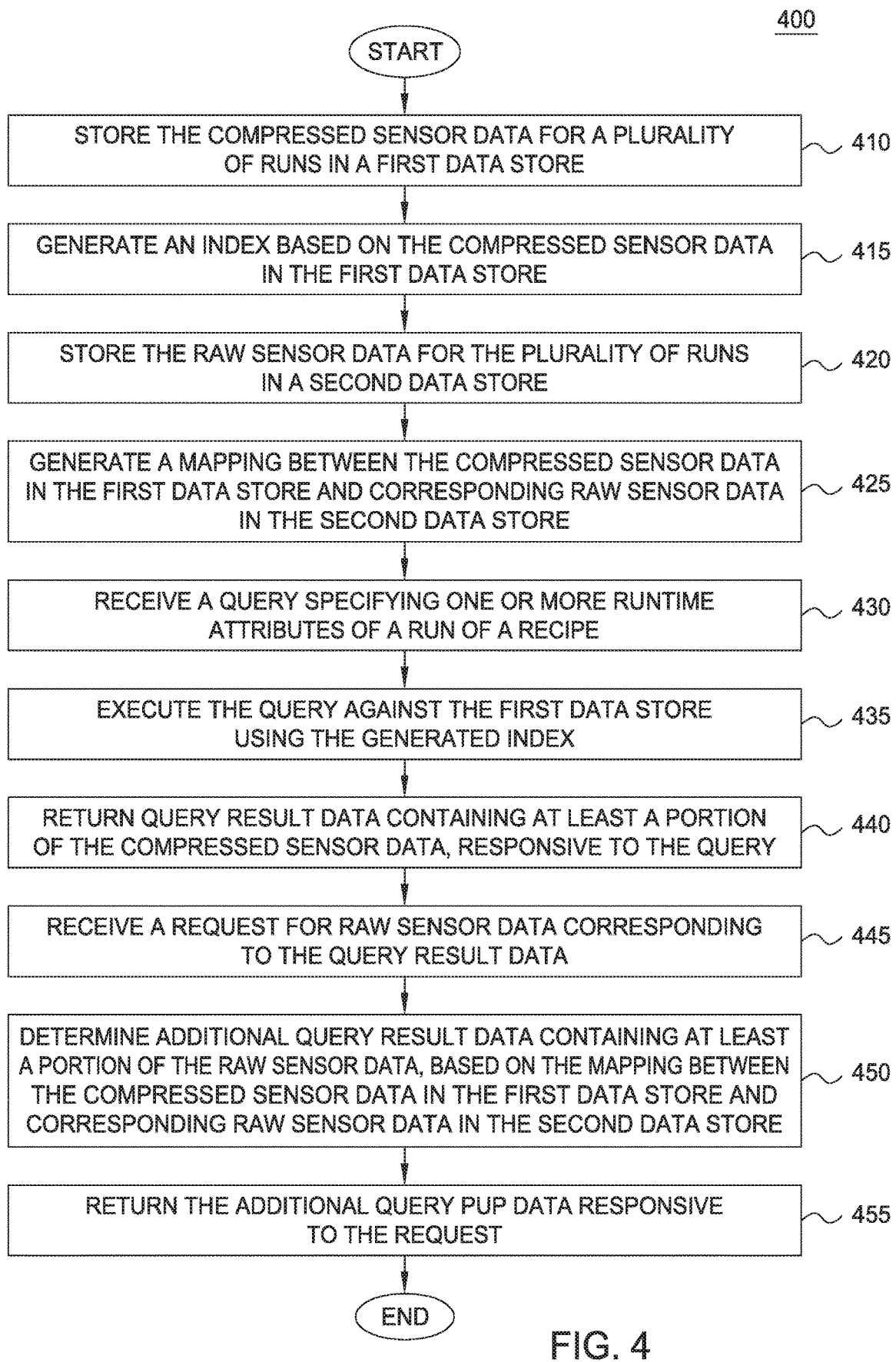
FIG. 4 is a flow diagram illustrating a method of searching compressed sensor data, according to one embodiment described herein.

FIG. 4 is a flow diagram illustrating a method of searching compressed sensor data, according to one embodiment described herein. As shown, the method 400 begins at block 410, where the fault detection component 120 stores compressed sensor data for a plurality of runs of a recipe in a first data store. For example, the fault detection component 120 could use the method 300 discussed above to generate the compressed sensor data. The fault detection component 120 then generates an index for the compressed sensor data within the data store (block 415). Generally, the index facilitates the efficient search of the compressed sensor data within the data store.

The fault detection component 120 additionally stores the raw sensor data within a second data store (block 420) and generates a mapping between the compressed sensor data in the first data store and corresponding raw sensor data in the second data store (block 425). Of note, in particular embodiments, the fault detection component 120 is configured to store the raw sensor data and the compressed sensor data within the same data store (e.g., within different tables of a database). More generally, any technique for storing the compressed and raw sensor data and for generating a mapping between the two types of data can be used, consistent with the functionality described herein.

In the depicted example, the fault detection component 120 then receives a query specifying one or more runtime attributes of a run of a recipe within a manufacturing environment (block 430). The fault detection component 120 executes the query against the first data store using the generated index (block 435). For instance, where the first data store represents a table within a particular database that contains the compressed sensor data, the fault detection component 120 could use a database index for the table to search the table for data values matching the parameters of the received query. The fault detection component 120 then returns the query results containing at least a portion of the compressed sensor data (block 440).

In certain use cases, a requestor (e.g., a remote software application, a user operating a client application, etc.) may wish to retrieve the raw sensor data that corresponds to query result containing the compressed sensor data. For instance, upon determining one or more historical runs of the recipe that match the query and receiving the compressed sensor data in the query results, the requestor may wish to retrieve the corresponding raw sensor data for further analysis. As an example, an application performing a detailed analysis on the query results may wish to analyze the raw sensor data, as opposed to the lossy compressed data returned in the query results.

As such, in the depicted example, the fault detection component 120 receives a request for the raw sensor data corresponding to the query result data (block 445) and determines additional query result data that contains at least a portion of the raw sensor data, using the generated mapping (block 450). For example, the query result data could contain compressed sensor data collected from a particular sensor during a particular run of the recipe, and the fault detection component 120 could use the mapping to retrieve the raw sensor collected by the particular sensor during the particular run of the recipe. The fault detection component 120 returns the additional query result data to the requestor (block 455) and the method 40 ends. Advantageously, doing so enables the fault detection component 120 to efficiently execute queries against the compressed sensor data, while still enabling the requesting entities to retrieve the raw sensor data as needed.

Figure 5:
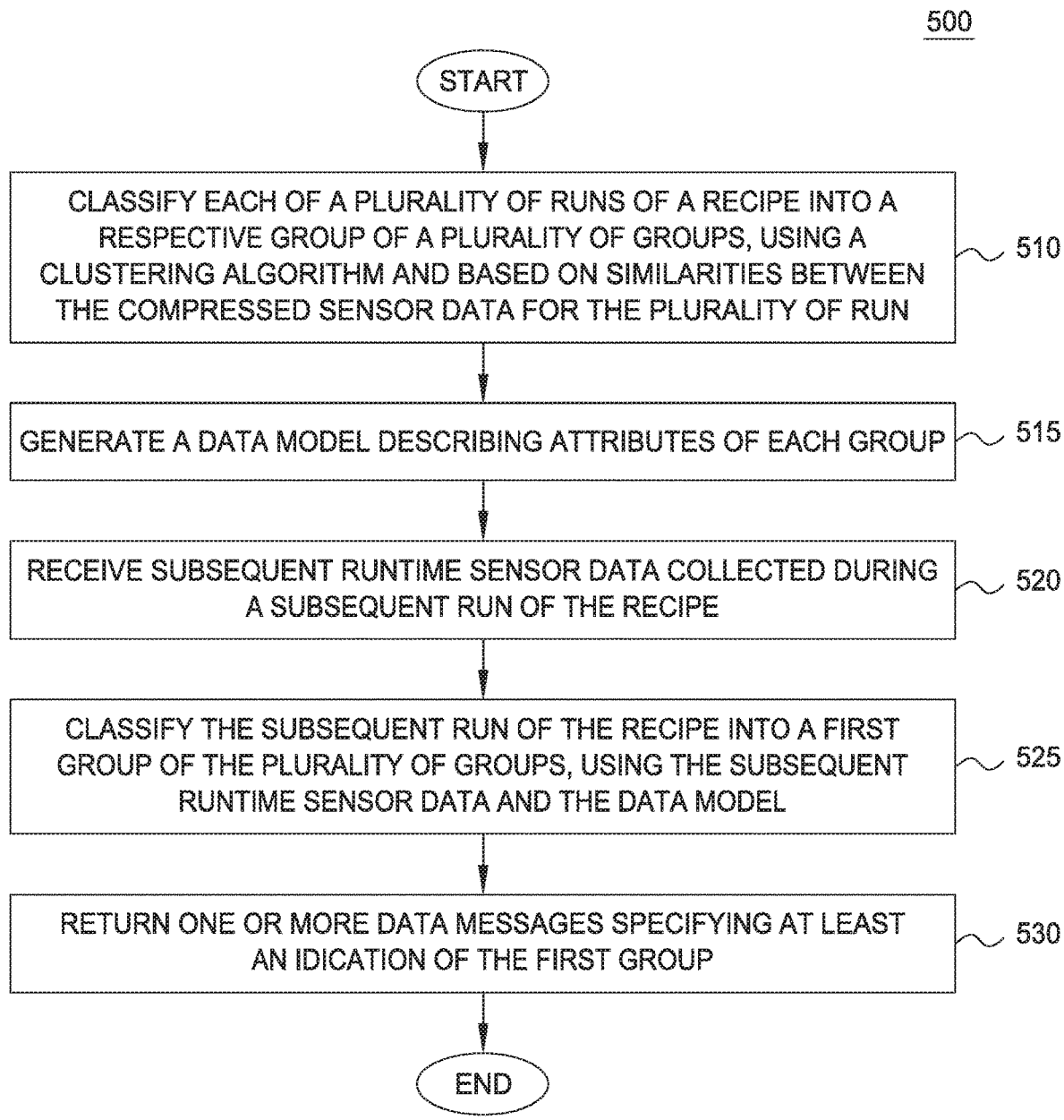
FIG. 5 is a flow diagram illustrating a method of classifying runs of a recipe within a manufacturing environment, according to one embodiment described herein.

FIG. 5 is a flow diagram illustrating a method of classifying runs of a recipe within a manufacturing environment, according to one embodiment described herein. As shown, the method 500 begins at block 510, where the fault detection component 120 classifies each of a plurality of runs of a recipe into a respective group of a plurality of groups, using a clustering algorithm and based on similarities between compressed sensor data collected during each respective run. For example, the fault detection component 120 could compress the raw sensor data collected during each run of the recipe using the method 300 described above.

The fault detection component 120 then generates a data model describing attributes of each group (block 515). In one embodiment, the fault detection component 120 is configured to generate the data model describing determined attributes of a normal, non-faulty run. In such an embodiment, the fault detection component 120 can use the data model to classify any run having sensor data that is sufficiently different from the determined attributes described in the data model (i.e., the attributes of a normal, non-faulty run) as an anomalous run (e.g., a faulty run). In a particular embodiment, the fault detection component 120 is configured to determine one or more types of faulty runs and to determine attributes of the faulty runs, in addition to the attributes of a normal, non-faulty run. The fault detection component 120 can then classify subsequent runs of the recipe into the classification whose attributes best match the attributes of the subsequent run.

Accordingly, in the depicted example, the fault detection component 120 receives subsequent runtime data collected during a subsequent run of the recipe (block 520) and classifies the subsequent run of the recipe into a first group, of a plurality of groups, using the subsequent runtime data and the generated data model (block 525). For instance, the fault detection component 120 could compare a shape of the subsequent runtime data with a shape of sensor data corresponding to the first group, and could classify the subsequent run of the recipe into the first group responsive to determining that the shapes are sufficiently similar to one another. Additionally, the subsequent runtime data may specify sensor values for each of a plurality of sensors, over each of a plurality of steps of the recipe. Accordingly, the fault detection component 120 could generate a representation of the shape of each unit of the subsequent runtime data (e.g., generating a respective shape for each sensor and for each step of the recipe) and could compare each shape with a corresponding shape (e.g., corresponding to the same sensor and the same step of the recipe) within the data model.

In performing the comparison, the fault detection component 120 could use the data model to determine a classification whose attributes best match the subsequent runtime data. As another example, the fault detection component 120 could determine that the subsequent runtime data is sufficiently different than the determined attributes for a normal run of the recipe and in response could classify the subsequent run as an anomalous, faulty run. The fault detection component 120 returns one or more data messages specifying at least an indication of the first group (block 530), and the method 500 ends.

As discussed above, in one embodiment, the fault detection component 120 is configured to use dynamic time warping techniques in classifying subsequent runs of the recipe. For example, prior to comparing the shape of the subsequent sensor data with the corresponding shapes for the plurality of groups described in the data model, the fault detection component 120 could scale the shape(s) with respect to the period of time over which the sensor data was collected. For instance, the fault detection component 120 could scale the shape of the subsequent sensor data along the axis corresponding to time to lengthen or shorten the shape along the axis, and could then compare the scaled shape to the corresponding shapes within the data model to determine the group that best matches the subsequent run. Doing so enables runs of different recipes to be properly compared with one another, even though the steps within the different recipes may be performed over different periods of time.

Figure 6:
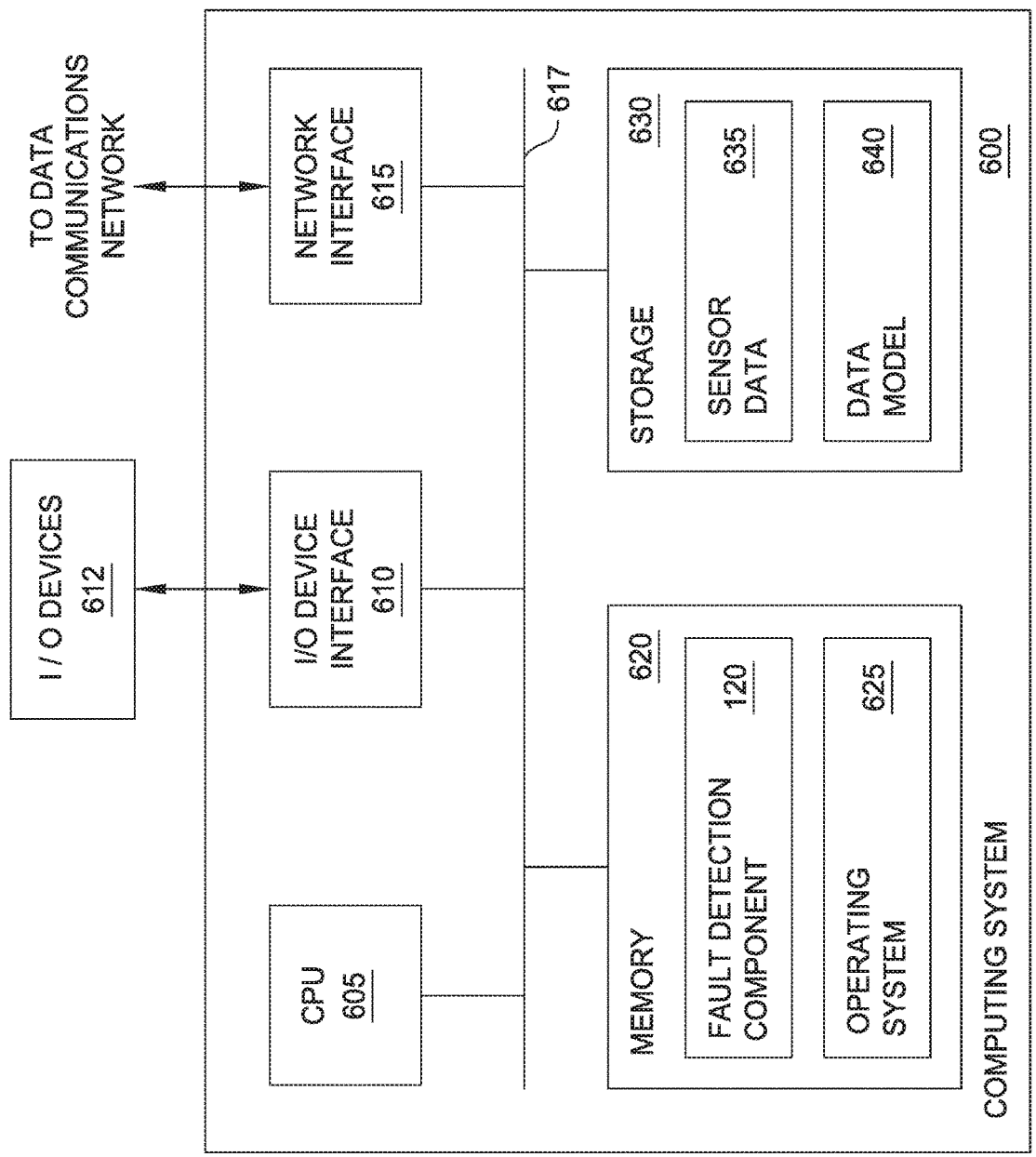
FIG. 6 illustrates a computing system configured with a fault detection component, according to one embodiment described herein.

FIG. 6 illustrates a computing system 600 configured to execute a fault detection component, according to one embodiment. As shown the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, mouse, and display devices) to the computing system 600. Further, in context of this disclosure, the computing elements shown in the computing system 600 may correspond to a physical computing system (e.g., a system in a data center) or may be a virtual computing instance executing within a computing cloud.

Generally, the CPU 605 retrieves and executes programming instructions stored in the memory 620 as well as stores and retrieves application data residing in the memory 620. The interconnect 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, the memory 620 includes fault detection component 120 and an operating system 625. The storage 630 includes sensor data 635 and a data model 640. In one embodiment, the fault detection component 120 is configured to monitor a plurality of runs of a recipe for fabricating one or more semiconductor devices within a manufacturing environment to collect runtime data from a plurality of sensors within the manufacturing environment. The fault detection component 120 can compress the collected runtime data by generating, for each of the plurality of sensors and for each of the plurality of runs, a respective representation of the corresponding runtime data that describes a shape of the corresponding runtime data and a magnitude of the corresponding runtime data. Upon receiving a query specifying one or more runtime data attributes, the fault detection component 120 can execute the query against the compressed runtime data to generate query results, by comparing the one or more runtime data attributes to at least one of the generated representations of runtime data, and can return the query results.

In a particular embodiment, upon compressing the runtime data, the fault detection component 120 divides the plurality of runs into a plurality of groups, by analyzing the compressed runtime data, where the runs assigned to each of the plurality of groups are determined to have similar compressed runtime data attributes to each other. The fault detection component 120 can then generate a data model describing attributes of the plurality of group. Upon receiving subsequent runtime data collected during a subsequent run of the recipe within the manufacturing environment, the fault detection component 120 can classify the subsequent run of the recipe into a first one of the plurality of groups, using the generated data model.

According to one embodiment, the fault detection component 120 is configured to monitor a plurality of runs of a plurality of recipes for fabricating one or more semiconductor devices within a manufacturing environment to collect runtime data from a plurality of sensors within the manufacturing environment. The fault detection component 120 can compress the collected runtime data by generating, for each of the plurality of sensors and for each of the plurality of runs, a respective representation of the corresponding runtime data that describes a shape of the corresponding runtime data. Upon receiving a query specifying one or more runtime data attributes, the fault detection component 120 can executing the query against the compressed runtime data to generate query results, by comparing the one or more runtime data attributes to at least one of the generated representations of runtime data, where the comparisons between the one or more runtime data attributes and the at least representation of runtime data are performed based on the shape of the corresponding runtime data using dynamic time warping techniques. Doing so enables the fault detection component 120 to compare recipe runs across different recipes based on the shape of the collected sensor data, without the considering the magnitude of the sensor data.

Figure 7:
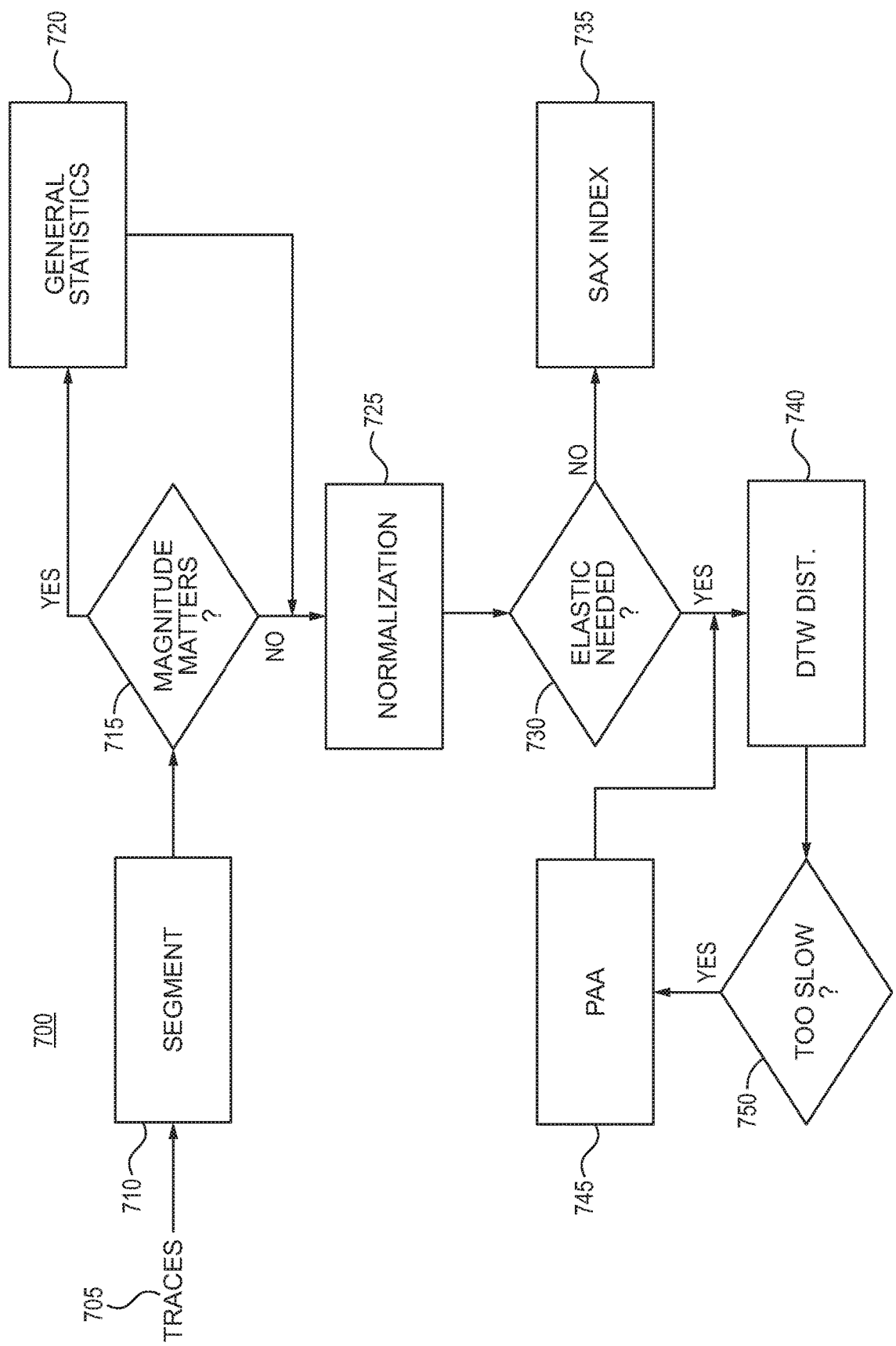
FIG. 7 illustrates a workflow for performing a trace search, according to one embodiment described herein.

FIG. 7 illustrates a workflow for performing a trace search, according to one embodiment described herein. As shown, the workflow 700 begins at block 705, where traces are collected by monitoring a plurality of runs of a recipe for fabricating one or more semiconductor devices within a manufacturing environment and collected from a plurality of sensors within the manufacturing environment. The trace data is segmented based on predefined steps of the recipe (block 710). The fault detection component 120 determines whether the magnitude of values within the traces is important for the given search query (block 715). For example, such a determination could be manually specified by a user of the system initiating the trace search query. In one embodiment, the determination as to whether the magnitude of the values is important is predefined based on the recipe being run within the manufacturing environment. In a particular embodiment, the determination is predefined for each step of the recipe being manufactured.

If the fault detection component 120 determines the magnitude of the values within the traces being searched is important for the current query, the fault detection component 120 uses general statistics and summary information describing the traces to pre-filter the search results (block 720). For example, the fault detection component 120 could consider the mean sensor value within the traces and could exclude from consideration sensor traces having a mean sensor value outside of a defined range (e.g., less than a threshold value, greater than a threshold value, between two threshold values, etc.).

If the fault detection component 120 determines the magnitude is not important for the current query or once the fault detection component 120 has performed the pre-filtering operation to exclude traces from consideration using general statistics describing the traces, the fault detection component 120 performs a normalization operation for the segmented trace data (block 725). The fault detection component 120 then determines whether an elastic search is needed for the current search query (block 730). For example, whether an elastic search is to be performed could be specified manually (e.g., by selecting an option within a graphical user interface) by a user initiating the query. As discussed above, an elastic search refers to a search for a pattern shape that will return traces that match the pattern shape, even when the shapes of the traces are over significantly different period of time. For example, the fault detection component 120 could determine that two runs are similar to one another when the shapes of sensor data collected by a particular sensor are sufficiently similar to one another, where a step of a first recipe is performed over 60 seconds, while the corresponding step of a different recipe is performed over 90 seconds. Continuing the example, the fault detection component 120 could scale the sensor data collected during a run of the first recipe to a 90 second window of time (e.g., by adjusting the time stamps at which the sensor data values were collected by a scaling value), and could then compare the scaled shape of the sensor data with the shape of sensor data collected during a run(s) of the second recipe. Such an elastic search operation enables the fault detection component 120 to detect similarities between different runs of different recipes.

The determination as to whether an elastic search is to be used for processing the search query could be manually specified by the user issuing the search query. In one embodiment, the fault detection component 120 could determine whether to perform an elastic search operation based on the recipe and/or step of the recipe that the traces 705 correspond to. If the fault detection component 120 determines an elastic search is not needed, the fault detection component 120 can query an index of Symbol Aggregate Approximation values to execute the search query.

Upon determining dynamic time warping is needed for processing the search query, the fault detection component 120 uses Dynamic Time Warping (DTW) techniques to perform the elastic search for the search query (block 740). In doing so, the fault detection component 120 can calculate an estimated runtime for the query (and/or an estimated amount of computational resources needed for processing the query). At block 750, if the fault detection component 120 determines that executing the search querying using DTW analysis will be too slow (e.g., the estimated runtime exceeds a predefined threshold amount of time, the estimated amount of computational resources exceeds a predefined threshold amount of resources, etc.), the fault detection component 120 can instead perform the elastic search for the search query using Piecewise Aggregate Approximation (PAA) techniques (block 745). In other words, the fault detection component 120 can select from one of a plurality of time alignment algorithms, depending on one or more estimates for processing the search query using an elastic search.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., fault detection component 120) or related data available in the cloud. For example, the fault detection component 120 could execute on a computing system in the cloud and could collect data from a plurality of sensor devices located within a manufacturing environment. The fault detection component 120 could compress the collected sensor data and could then generate a data model using the compressed data. The fault detection component 120 could use the data model to classify subsequent production runs in the manufacturing environment. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:
monitoring a plurality of runs of a recipe for fabricating one or more semiconductor devices within a manufacturing environment to collect runtime data from a plurality of sensors within the manufacturing environment;
compressing the collected runtime data by generating, for each of the plurality of sensors involved in each of the plurality of runs, a respective representation of corresponding runtime data that describes a shape of the collected runtime data and a magnitude of the collected runtime data;
dividing the plurality of runs into a plurality of groups, by analyzing the compressed runtime data, wherein the runs assigned to each of the plurality of groups are determined to have similar shape and magnitude of compressed runtime data attributes to each other;
generating a data model describing an average shape of the compressed runtime data of each the plurality of groups, the data model comprising a weight for a sensor type;
receiving subsequent runtime data collected during a subsequent run of the recipe within the manufacturing environment, the subsequent runtime data comprising a sensor value;
weighting the sensor value based on the weight for the sensor type; and
classifying the subsequent run of the recipe into a first group of the plurality of groups, based on the shape of the subsequent runtime data and weighted sensor value;
receiving a query specifying one or more runtime data attributes;
executing the query against the compressed runtime data of the plurality of groups to generate query results comprising a classification of the subsequent run of the recipe, by comparing the one or more runtime data attributes to at least one of the respective representations of corresponding runtime data; and
returning the query results.

2. The method of claim 1, wherein the shape of the runtime data is represented using indexable Symbolic Aggregate Approximation (iSAX) representation.

3. The method of claim 1, wherein a comparison between the one or more runtime data attributes and the at least one of the generated representations of corresponding runtime data are performed based on the shape of the corresponding runtime data, by dynamically scaling a timestamp of at least one data value in the generated representations of runtime data.

4. The method of claim 3, wherein a first axis of the shape of the corresponding runtime data is with respect to time and wherein a second axis of the shape of the corresponding runtime data is with respect to sensor data collected from a corresponding sensor, and wherein executing the query against the compressed runtime data further comprises:
scaling the shape of the corresponding runtime data with respect to the first axis, wherein the scaled shape is compared with the one or more runtime data attributes specified within the query.

5. The method of claim 1, wherein compressing the collected runtime data further comprises:
generating a string value representing the shape of the corresponding runtime data, wherein each character of the string value is selected from a predefined set of characters.

6. The method of claim 5, wherein each character in the predefined set of characters corresponds to a respective magnitude value.

7. The method of claim 6, wherein compressing the collected runtime data further comprises:
generating a magnitude scaling value that, when applied to the string value representing the shape of the corresponding runtime data, restores data values of the corresponding runtime data.

8. The method of claim 1, wherein compressing the collected runtime data further comprises:
generating, for each of step of the recipe, the respective representation of the corresponding runtime data that describes a shape of the corresponding runtime data and a magnitude of the corresponding runtime data.

9. A method, comprising:
monitoring a plurality of runs of a recipe for fabricating one or more semiconductor devices within a manufacturing environment to collect runtime data from a plurality of sensors within the manufacturing environment;
compressing the collected runtime data by generating, for each of the plurality of sensors involved in each of the plurality of runs, a respective representation of corresponding runtime data that describes a shape of the collected runtime data and a magnitude of the collected runtime data;
dividing the plurality of runs into a plurality of groups, by analyzing the compressed runtime data, wherein the runs assigned to each of the plurality of groups are determined to have similar shape and magnitude of compressed runtime data attributes of a group;
generating a data model describing an average shape of the compressed runtime data of each the plurality of groups, the data model comprising a weight for a sensor type;
receiving subsequent runtime data collected during a subsequent run of the recipe within the manufacturing environment, the subsequent runtime data comprising a sensor value;
weighting the sensor value based on the weight for the sensor type; and
classifying the subsequent run of the recipe into a first group of the plurality of groups, based on the shape of the subsequent runtime data and weighted sensor value.

10. The method of claim 9, further comprising:
determining one or more attributes of the subsequent run of the recipe, based on the first group.

11. The method of claim 9, wherein compressing the collected runtime data further comprises:
generating, for each of step of the recipe, the respective representation of the corresponding runtime data that describes a shape of the corresponding runtime data and a magnitude of the corresponding runtime data.

12. The method of claim 9, further comprising:
classifying the subsequent run of the recipe into the first group, using the generated data model:
determining one or more maintenance operations that have historically influenced the classification of runs of the recipe within the manufacturing environment from the first group into a second group; and performing the one or more maintenance operations within the manufacturing environment, wherein the one or more maintenance operations include at least (i) an auto-calibration operation for one or more pieces of equipment within the manufacturing environment and (ii) initiating a run of a maintenance recipe, distinct from the recipe, within the manufacturing environment.

13. The method of claim 9, further comprising:
recording, for each sensor value within the collected runtime data, a step of the recipe during which the sensor value was collected, wherein dividing the plurality of runs into a plurality of groups by analyzing the compressed runtime data is further based on the recorded steps for the collected runtime data.

14. The method of claim 13, wherein the data model further includes, for each group of the plurality of groups, a respective weight for each step of the recipe, wherein the weight describes a relative importance of the respective step in defining the respective group.

15. A method, comprising:
monitoring a plurality of runs of a plurality of recipes for fabricating one or more semiconductor devices within a manufacturing environment;
collecting runtime data from a plurality of sensors within the manufacturing environment;
compressing the collected runtime data by generating, for each of the plurality of sensors involved in each of the plurality of runs, a respective representation of corresponding runtime data that describes a shape of the collected runtime data;
dividing the plurality of runs into a plurality of groups, by analyzing the compressed runtime data, wherein the runs assigned to each of the plurality of groups are determined to have similar shape and magnitude of compressed runtime data attributes of a group;
generating a data model describing an average shape of the compressed runtime data of each the plurality of groups, the data model comprising a weight for a sensor type;
receiving subsequent runtime data collected during a subsequent run of the recipe within the manufacturing environment, the subsequent runtime data comprising a sensor value;
weighting the sensor value based on the weight for the sensor type; and
classifying the subsequent run of the recipe into a first group of the plurality of groups, based on the shape of the subsequent runtime data and weighted sensor value;
receiving a query specifying one or more runtime data attributes;
executing the query against the compressed runtime data of the plurality of groups to generate query results comprising a sensor group classification, by comparing the one or more runtime data attributes to at least one of the respective representations of runtime data, wherein a comparison between the one or more runtime data attributes and the respective representation of corresponding runtime data are performed based on the shape of the corresponding runtime data using dynamic time warping techniques; and
returning the query results.

16. The method of claim 15, wherein the shape of the corresponding runtime data is a coordinate representation, wherein a first axis of the shape of the corresponding runtime data is with respect to time and wherein a second axis of the shape of the corresponding runtime data is with respect to sensor data collected from a corresponding sensor, and wherein executing the query against the compressed runtime data further comprises:
scaling the shape of the corresponding runtime data with respect to the first axis, wherein the scaled shape is compared with the one or more runtime data attributes specified within the query.

17. The method of claim 15, wherein compressing the collected runtime data further comprises:
generating a string value representing the shape of the corresponding runtime data, wherein each character of the string value is selected from a predefined set of characters.

18. The method of claim 17, wherein each character in the predefined set of characters corresponds to a respective magnitude value.

19. The method of claim 18, wherein compressing the collected runtime data further comprises:
generating a magnitude scaling value that, when applied to the string value representing the shape of the corresponding runtime data, restores data values of the corresponding runtime data.

20. The method of claim 15, wherein the shape of the runtime data is represented using indexable Symbolic Aggregate Approximation (iSAX) representation.

* * * * *